(12) United States Patent
Chang

(10) Patent No.: US 10,789,375 B2
(45) Date of Patent: Sep. 29, 2020

(54) UNIFIED STORAGE MANAGEMENT

(71) Applicant: Oxygen Cloud, Inc., Cupertino, CA (US)

(72) Inventor: Peter C. Chang, Cupertino, CA (US)

(73) Assignee: Oxygen Cloud, Inc., Cupertino, CA (US)

( * ) Notice: Subject to any disclaimer, the term of this patent is extended or adjusted under 35 U.S.C. 154(b) by 235 days.

(21) Appl. No.: 15/925,450

(22) Filed: Mar. 19, 2018

(65) Prior Publication Data

US 2019/0286827 A1 Sep. 19, 2019

(51) Int. Cl.
*G06F 21/60* (2013.01)
*G06F 21/62* (2013.01)
*H04L 29/08* (2006.01)
*G06F 16/13* (2019.01)
*G06F 16/176* (2019.01)
*G06F 16/178* (2019.01)
*G06F 16/182* (2019.01)

(52) U.S. Cl.
CPC ............ *G06F 21/604* (2013.01); *G06F 16/13* (2019.01); *G06F 16/176* (2019.01); *G06F 16/178* (2019.01); *G06F 16/183* (2019.01); *G06F 21/6218* (2013.01); *H04L 67/06* (2013.01); *H04L 67/1097* (2013.01)

(58) Field of Classification Search
CPC .............. G06F 21/6218; G06F 21/604; G06F 21/6209; H04L 67/1097
See application file for complete search history.

(56) References Cited

U.S. PATENT DOCUMENTS

| 2010/0274969 | A1* | 10/2010 | Popovski | ................ G06F 3/064 711/118 |
| 2014/0215004 | A1* | 7/2014 | Daly, Jr. | ................ G06Q 40/02 709/214 |
| 2015/0032840 | A1* | 1/2015 | Daly, Jr. | ............. H04L 67/1097 709/216 |
| 2017/0250940 | A1* | 8/2017 | Chao | ........................ H04L 67/22 |

\* cited by examiner

*Primary Examiner* — Dao Q Ho
(74) *Attorney, Agent, or Firm* — Kilpatrick Townsend & Stockton LLP

(57) ABSTRACT

Techniques for managing data files spread across different remote storage systems are described. A remote storage management system can provide a unified file system that interacts with different remote storage services to allow a user to manage, from one interface, the user's data stored in different source systems. The remote storage management system may allow a user to create sharable cloud drives with combination of files from the unified file system irrespective of which service provider is storing the files. The generated cloud drive can be shared with a recipient to give the recipient access to the user's files. The recipient is not required to have an account with any of the remote storage service providers or with the remote storage management system.

18 Claims, 5 Drawing Sheets

UNIFIED STORAGE MANAGEMENT

BACKGROUND

File hosting or cloud storage services provide users with the ability to upload local files to a networked remote storage system for file backup and sharing. Such services allow users to view or access uploaded files from different devices, and may allow different users to access and modify the same uploaded file in a collaborative environment. However, because information and data are created and shared in different contexts, individuals and groups tend to store files across a growing number of different storage systems. For example, a user may use a photo sharing service to upload images captured from the user's mobile device for remote storage and sharing, and for files originating on the user's computing device, the user may use a cloud storage service associated with the manufacturer of the computing device. As such, a user's files can be scattered in disparate storage systems with different service providers and each storage may require a separate login and application to access, making it cumbersome to access, share, and/or manage the files. For example, in order to share files from disparate storage systems to a recipient, a user may have to create separate links to the different storage systems, and the recipient may have to access the shared files using multiple links even though the files are being shared from the same user.

Embodiments of the present invention can address these and other problems individually and collectively.

BRIEF SUMMARY OF THE INVENTION

According to some embodiments, a computer-implemented method for managing a user's files stored at different remote storage systems may include receiving a request from a user to generate a cloud drive at a remote storage management system. The remote storage management system may receive a selection of a first set of one or more files stored at a first remote storage system to include in the cloud drive, and store a first set of metadata associated with the first set of one or more files in the cloud drive. The remote storage management system may receive a selection of a second set of one or more files stored at a second remote storage system to include in the cloud drive, and store a second set of metadata associated with the second set of one or more files in the cloud drive. To share the generated cloud drive with a recipient, the remote storage management device can generate an access link that is used to access the cloud drive, and provide the access link to the user for transmission to a recipient to access both the first set of one or more files and the second set of one or more files using the access link. According to some embodiments, a computing device may include a processor and a memory storing executable code, which when executed by the processor, implements the method for managing a user's files stored at different remote storage systems.

DETAILED DESCRIPTION

Techniques for managing data files spread across different remote storage systems are described. According to some embodiments, a remote storage management system can provide a unified file system that interacts with different remote storage services to allow a user to manage, from one interface, the user's data stored in different source systems. The remote storage management system may allow a user to create sharable cloud drives with any combination of files from the unified file system irrespective of which service provider is storing the files. The generated cloud drive can be shared with a recipient to give the recipient access to the user's files. The recipient is not required to have an account with any of the remote storage service providers or with the remote storage management system. New cloud drives can also be created from other cloud drives in the unified file system. The techniques described herein allows a user to have control of the user's files from one interface and provides greater flexibility on how the user organize, access, and share files.

By way of example, a user may have some files stored with one service provider and other files stored with a second service provider. In order to access files from the different remote storage service providers, the user may have to use separate applications, applets, or point the web browser to separate locations to access the two storage systems. Furthermore, the user may have to provide different credentials for separate accounts corresponding to the two storage systems. When the user wants to share a file stored with the first service provided and another file stored with the second service provider to the same recipient, the user may have to access the two storage systems separately and submit separate requests to share the two files with the recipient. Not only is this cumbersome for the user, the process can also cumbersome for the recipient, because the recipient may have to open two separate links in order to access the two files stored at the different service providers. With the remote storage management system described herein, a user can add the two files stored with different service providers to the unified file system and access the two files from one interface even though the two files are stored at different source systems. Furthermore, a sharable cloud drive can be generated to include the two files, and a single access link can be generated to give a recipient access to the two files. This makes it convenient for a user to manage all of his/her data and allow the user to easily share data spread across disparate source systems.

Figure 1:
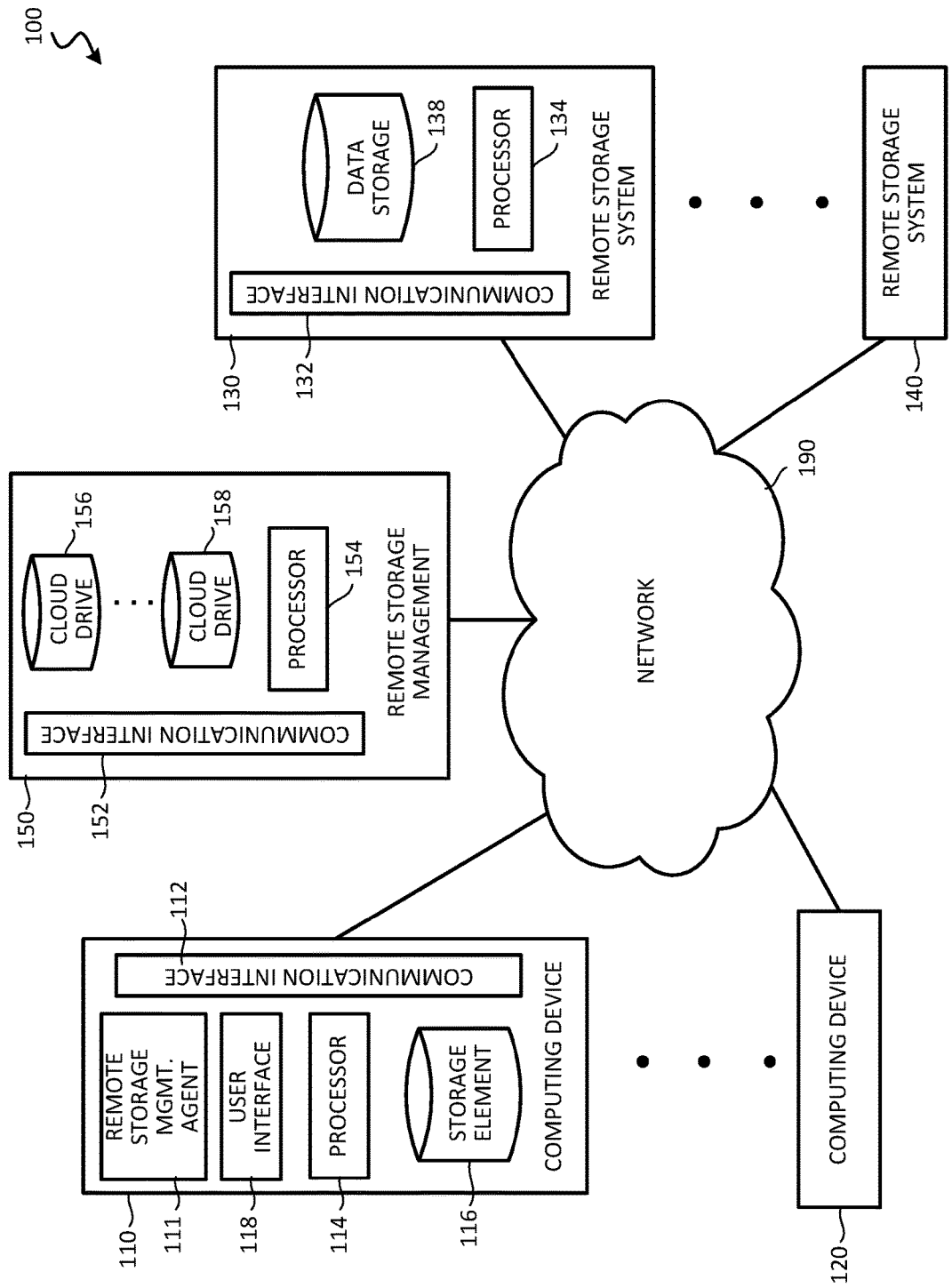
FIG. 1 illustrates a system implementing remote storage management techniques, according to some embodiments.

FIG. 1 illustrates a system 100 implementing the remote storage management techniques described herein, according to some embodiments. System 100 may include one or more computing devices 110-120 connected to one or more remote storage systems 130-140 and a remote storage management system 150 via a network 190. Each of remote storage systems 130-140 can be operated by a different remote storage service provider, and may require a user to set up an account with the service provider to gain access to the storage. Examples of remote storage systems 130-140 may include iCloud, OneDrive, Google Drive, DropBox, Box, Instagram, Facebook, etc. Any of computing devices 110-120 can be a client computing device such as a personal computer, an internet of things (IOT) device, a portable computing device (e.g., a mobile phone such as smart phone, a notepad computer, a tablet, a wearable device, etc.), or other electronic device with wired or wireless communication capabilities. One or more of computing devices 110-120 can be a user computing device associated with an end user, and be operated by the user to access and/or manipulate the user's files stored on local computing device and/or remote storage systems 130-140. One or more of computing devices 110-120 can also be a recipient computing device associated with a recipient, and can be used by the recipient to access files shared by another user whose files are stored at remote storage systems 130-140. It should also be understood that in some embodiments, a computing device can act as both a user computing device and a recipient computing device.

Computing device 110 may include a communication interface 112, a processor 114, a computer readable storage element 116, and a user interface 118. Communication interface 112 may include wired and/or wireless network components such as a network interface card and/or wireless transceiver to enable communication between computing device 110 and other elements of system 100, such as remote storage systems 130-140 and/or remote storage management device 150. Processor 114 may include one or more microprocessors operable to execute instructions that cause computing device 110 to perform various operations. For example, processor 114 may execute software code (e.g., stored in storage element 116) to implement the synchronization techniques described herein. Storage element 116 can be used to locally store a user's files, and may include one or more of random access memory (RAM), read-only memory (ROM), flash memory, electrically-erasable programmable read-only memory (EEPROM), a hard disk, an optical disk, etc., or combinations thereof. User interface 118 may include one or more elements for receiving input from a user and providing outputs to the user. For example, user interface 118 may include a keypad, a display, a touch screen, etc., or a combination thereof.

According to some embodiments, computing device 110 may include a remote storage management agent 111 to facilitate management of files stored at remote storage systems 130-140. Remote storage management agent 111 can be an application or a plugin associated with a remote storage management service provider. In some embodiments, remote storage management agent 111 can be downloaded to computing device 110 and stored in storage element 116 when a user enrolls or subscribes to the remote storage management service provider. Remote storage management agent 111 may provide connectivity to remote storage management system 150 to allow a user to access, manage, and share files stored at remote storage systems 130-140 using remote storage management system 150 as a single interface to the various storage systems. In some embodiments, the functionalities of remote storage management system 150 can be integrated into remote storage management agent 111 to enable computing device 110 to act as remote storage management device 110.

Remote storage system 130 may include a networked computing device (e.g., a server) operable to store and disseminate data (e.g., files such as photos, video and/or audio media, documents, communications, etc.) and metadata associated with the data. In some embodiments, remote storage system 130 can be implemented as a system of networked computing devices, and can operate as a cloud storage to provide distributed storage of data on the networked computing devices. Remote storage system 130 may include a communication interface 132, a processor 134, and a data storage element 138. Communication interface 132 may include wired and/or wireless network components such as a network interface card and/or wireless transceiver to enable communication between remote storage system 130 and other elements of system 100, such as computing systems 110-120. Processor 134 may include one or more microprocessors operable to execute instructions that cause remote storage system 130 to perform various operations such as managing user accounts, storing data uploaded by users to data storage element 138, and performing access control to the data, etc.

Data storage element 138 can be used to store data uploaded by users, and metadata indicating one or more characteristics, attributes, and/or properties of the data (e.g., date and/or time of creation, date and/or time of last modification, author, version, title, file type, encoding algorithm, classification information, tags, data source, size information such as memory size, pixel count, number of words, lines, paragraphs, resolution, etc.). Data storage element 138 can be implemented using one or more of random access memory (RAM), read only memory (ROM), flash memory, electrically-erasable programmable read only memory (EEPROM), a hard disk, an optical disk, etc., or combinations thereof. In some embodiments, data storage element 138 can be distributed over two or more physical storage elements. Furthermore, data storage element 138 can be integrated as part of one or more of the networked computing devices of remote storage system 130, or can be externally coupled to remote storage system 130. In some embodiments, a client computing device such as any of computing device 110-120 can also act as remote storage system 130. Thus, a user with multiple computing devices can utilize one or more of the computing devices as remote storage for the user's data.

Remote storage management system 150 may include a networked computing device (e.g., a server) operable to interface computing devices 110-120 with remote storage systems 130-140. In some embodiments, remote storage management system 150 can be implemented as a system of networked computing devices, and can also operate as a cloud storage provider to provide distributed storage of data on the networked computing devices. Thus, in some embodiments, remote storage management system 150 itself may function as a remote storage system. Remote storage management system 150 may include a communication interface 152, and a processor 154. Communication interface 152 may include wired and/or wireless network components such as a network interface card and/or wireless transceiver to enable communication between remote storage system 150 and other elements of system 100, such as computing systems 110-120. Processor 154 may include one or more microprocessors operable to execute instructions that cause remote storage management system 150 to perform the remote storage management techniques described herein. Remote storage management system 150 may also include one or more cloud drives 156-158. Each cloud drive can be created by a user to represent a collection of data or files. The data or files associated with a particular cloud drive can be stored in any combination of one or more of remote storage systems 130-140, computing devices 110-120, and/or remote storage management system 150.

Network 190 can provide communications between various entities, such as between any of computing devices 110-120, remote computing systems 130-140, and/or remote storage management system 150. Network 190 may include a local area network, a wide-area network, a virtual private network, the Internet, an intranet, an extranet, a public switched telephone network, an infrared network, a wireless data network, a cellular network, or any other data network or combinations thereof. Network 190 can be implemented with various network topology. Examples of suitable network topologies may include simple point-to-point, peer-to-peer, bus topology, star topology, ring topology, mesh topology, hybrid topology, or combinations thereof. Components utilized for such a network may depend upon the type of network and/or environment selected. Network 190 may utilize any suitable protocol, such as TCP/IP, OSI, FTP, UPnP, NFS, CIFS, etc. Communications over network 190 can be implemented using wired or wireless connections, or combinations thereof.

Figure 2:
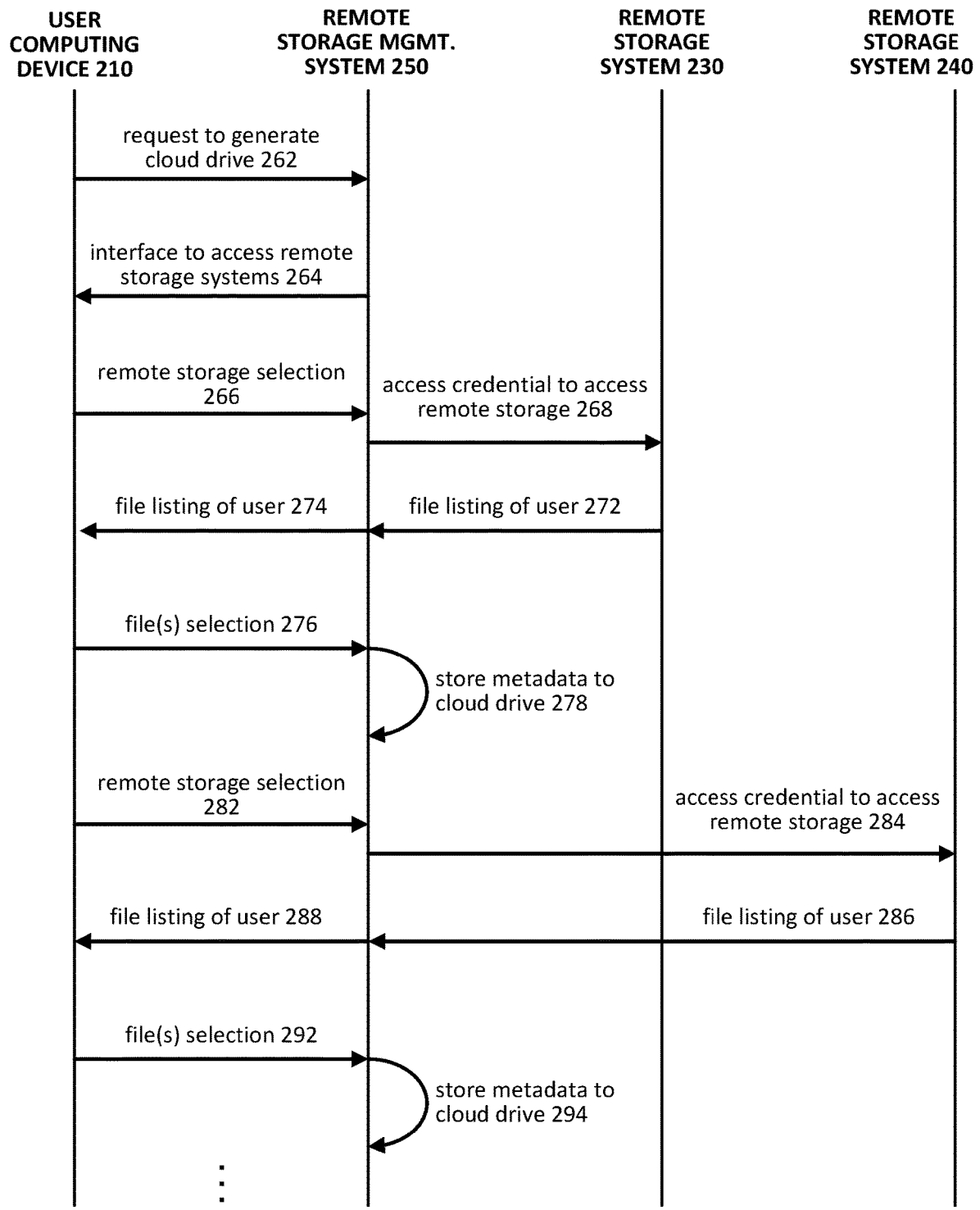
FIG. 2 illustrates a communication flow diagram of a process for creating a cloud drive at remote storage management system, according to some embodiments.

FIG. 2 illustrates a communication flow diagram of a process for creating a cloud drive at remote storage management system, according to some embodiments. Remote storage management system 250 may provide a unified file system to consolidate data files from different remote storage service providers, and one or more cloud drives can be created to group or organize a user's files. Prior to creating a cloud drive at remote storage management system 250, a user may be required to register and set up an account with the remote storage management service provider. The user may access remote storage management system 250 via a web browser, a dedicated application, or a plug-in installed on user computing device 210.

To initiate the process, a user operating user computing device 210 may log into the user's account at remote storage management system 250, and be directed to the user's account landing page. From the landing page, the user may request remote storage management system 250 to generate a cloud drive for the user's account at operation 262. In response to receiving the request, remote storage management system 250 may provide an interface to user computing device 210 to access one or more remote storage systems at operation 264. In some embodiments, the interface can be in the form of a pop-up window with a list of remote storage service providers. At operation 266, the user may select a remote storage service provider from the list of remote storage service providers. In some embodiments, the user may manually provide the service provider (e.g., entering a URL) if the service provider is not listed.

At operation 268, in response to receiving the selection of the remote storage service provider, remote storage management system 250 may provide the requisite access credential to access the selected remote storage system 230. In some embodiments, the user's access credentials (e.g., username and password) can be stored at the remote storage management system 250 via registration process. For example, the user may provide the access credentials associated with the user's accounts at various remote storage systems to the remote storage management system 250 when setting up or updating the user's account with remote storage management system 250. In some embodiments, the user may authorize remote storage system 230 to grant access to remote storage management system 250. For example, the user may authorize remote storage system 230 to provide an access token to remote storage management system 250, and the access token can be stored as the access credential at remote storage management system 250. In such embodiments, remote storage management system 250 can use the access token to access remote storage system 230 without sending password information.

At operation 272, in response to verifying the user's access credentials, remote storage system 230 may provide to remote storage management system 250 a file listing of files associated with the user's account stored at remote storage system 230. The file listing may include a directory structure organizing the user's files in folders and/or sub-folders, and may also include metadata indicating one or more characteristics, attributes, and/or properties of each of the user's files. At operation 274, the file listing is forwarded to user computing device 210. The file listing may allow the user to navigate the directory structure to select particular folders/subfolders and/or files to add to the cloud drive.

At operation 276, remote storage management system 250 receives the selection of one or more files stored at remote storage system 230 for addition to the cloud drive. One or more folders/subfolders, one or more files, or a combination thereof can be selected. At operation 278, remote storage management system 250 stores metadata (e.g., filename, file path, size, type, etc.) associated with the selected files in the created cloud drive and associates the cloud drive with the user's account. Remote storage management system 250 may also maintain a mapping of the metadata to the access credential used for accessing remote storage system 230. It should be noted that in some embodiments, remote storage management system 250 does not store the selected files themselves. Instead, remote storage management system 250 only needs to store the source of the files and metadata associated with the files to identify the files at the source. In this manner, the cloud drive can practically have no size limitation and any number of cloud drives can be created as storage of the underlying files remain at the file source (e.g., remote storage system 230).

Operations 266 to 278 can be repeated for any number of remote storage systems where the user has stored his/her files. For example, operations 266 to 278 can be repeated as operations 282 to 294 as shown in FIG. 2 for a second remote storage system 240. As such, the cloud drive being created can include files from different remote storage systems such as remote storage system 230 and remote storage system 240. In some embodiments, the different remote storage systems can be operated by different service providers and may require different credentials to access.

Figure 3:
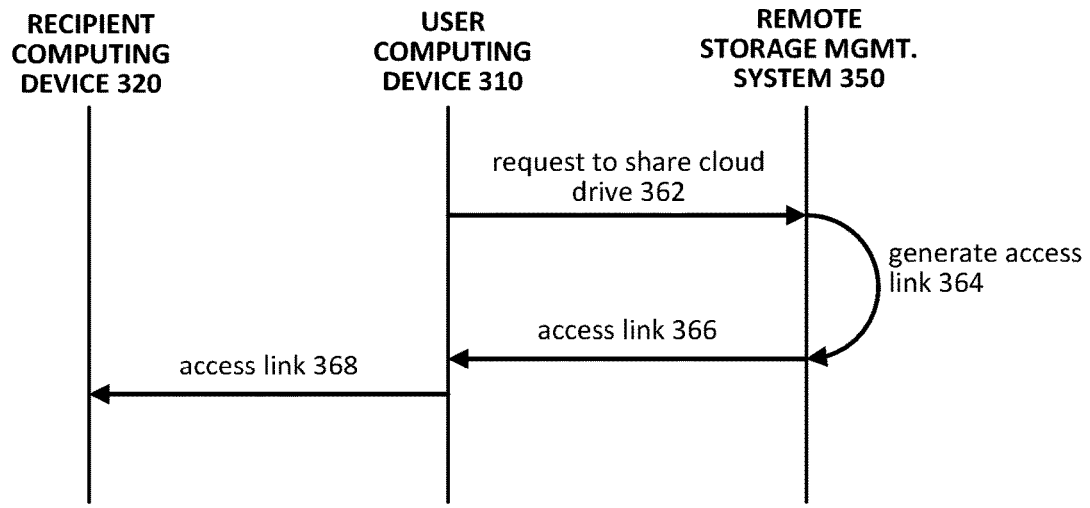
FIG. 3 illustrates a communication flow diagram of a process for sharing a cloud drive maintained by a remote storage management system, according to some embodiments.

FIG. 3 illustrates a communication flow diagram of a process for sharing a cloud drive maintained by a remote storage management system, according to some embodiments. The process shown in FIG. 3 can be used, for example, to share a cloud drive generated by the process shown in FIG. 2 to a recipient. At operation 362, a user operating user computing device 310 may log onto remote storage management system 350 (if not already logged on), and request remote storage management system 350 to share a cloud drive created under the user's account. In some embodiments, the user may select one or more cloud drives from a list of the user's cloud drives to share.

At operation 364, remote storage management system 350 may generate an access link (e.g., a URL) that can be used by the recipient to access the user's cloud drive and files contained in the cloud drive. In some embodiments, the access link may have an expiration time after which the access link cannot be used to access the cloud drive. The access link can also be associated with access permissions indicating whether a recipient of the access link can edit or modify the source files contained in the cloud drive. The access permissions can be set for the entire cloud drive, or per folder/subfolder or per file in the cloud drive. The access link may also be associated with and/or include any credential (e.g., a token) needed to access the cloud drive such that a recipient without an account with remote storage management system 350 can access the cloud drive. The access link is then provided to user computing device 310 at operation 366, and the access link can be forwarded to a recipient operating a recipient computing device 320 at operation 368.

Figure 4:
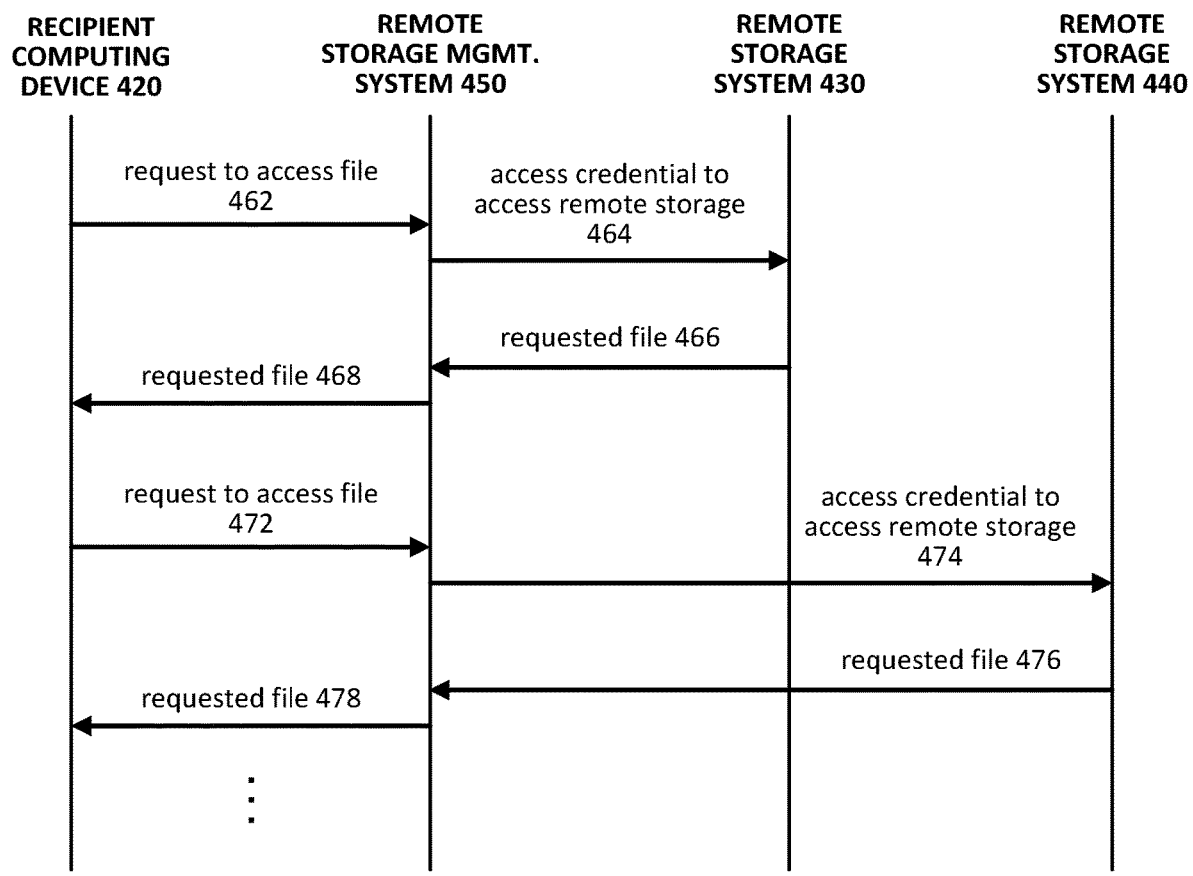
FIG. 4 illustrates a communication flow diagram of a process for accessing a shared cloud drive by a recipient of an access link, according to some embodiments.

FIG. 4 illustrates a communication flow diagram of a process for accessing a shared cloud drive by a recipient of an access link, according to some embodiments. A recipient of an access link to a shared cloud drive 410 may open the access link on recipient computing device 420 to gain access to the cloud drive shared by a user. The access link may direct the recipient to remote storage management system 450 via a web browser or an application or plug-in installed on recipient computing device 420, and remote storage management system 450 may present a directory structure representing the cloud drive on recipient computing device 420. In some embodiments, opening the access link may create a computer drive mapped to the cloud drive in the file system of recipient computing device 420, and the metadata associated with the contents of the cloud drive can be stored locally on recipient computing device 420 without storing the actual files. The recipient may access the cloud drive in a similar manner as a local or networked drive on recipient computing device 420. For example, the user may open the computer drive representing the shared cloud drive on recipient computing device 420 to bring up the directory structure of the cloud drive.

The user may navigate the directory structure of the cloud drive and attempt to open or access a selected file in the cloud drive. In response to the selection of the file, at operation 462, recipient computing device 420 may send a request to remote storage management system 450 to access the file. In response to the request, remote storage management system 450 may determine the source of the selected file and identify remote storage system 430 as the storage system storing the requested file. Remote storage management system 450 may then look up the access credential for remote storage system 430 associated with the creator or owner of the cloud drive, and provide the access credential to access remote storage system 430 at operation 464. For example, the access credential for remote storage system 430 can be the username and password of the account of the creator/owner of the cloud drive at remote storage system 430 previously stored on remote storage management system 450, or can be an access token (e.g., a string token) given to remote storage management system 450. At operation 466, remote storage system 430 may provide the requested file to remote storage management system 450. At operation 468, the requested file can be forwarded to recipient computing device 420 and be locally stored on recipient computing device 420.

At operation 472, the user may navigate the directory structure of the cloud drive and attempt to open or access another file that is resident in a different remote storage system such as remote storage system 440, and recipient computing device 420 may send a request to remote storage management system 450 to access the file. In response to the request, remote storage management system 450 may determine the source of the selected file and identify remote storage system 440 as the storage system storing the requested file. Remote storage management system 450 may then look up the access credential for remote storage system 440 associated with the creator or owner of the cloud drive, and provide the access credential to access remote storage system 440 at operation 474. At operation 476, remote storage system 440 may provide the requested file to remote storage management system 450. At operation 478, the requested file resident at remote storage system 440 can be forwarded to recipient computing device 420 and be locally stored on recipient computing device 420. Accordingly, the cloud drive generated by remote storage management system 450 can provide a unified file system to allow access to files resident in different remote storage systems from a unified interface.

Figure 5:
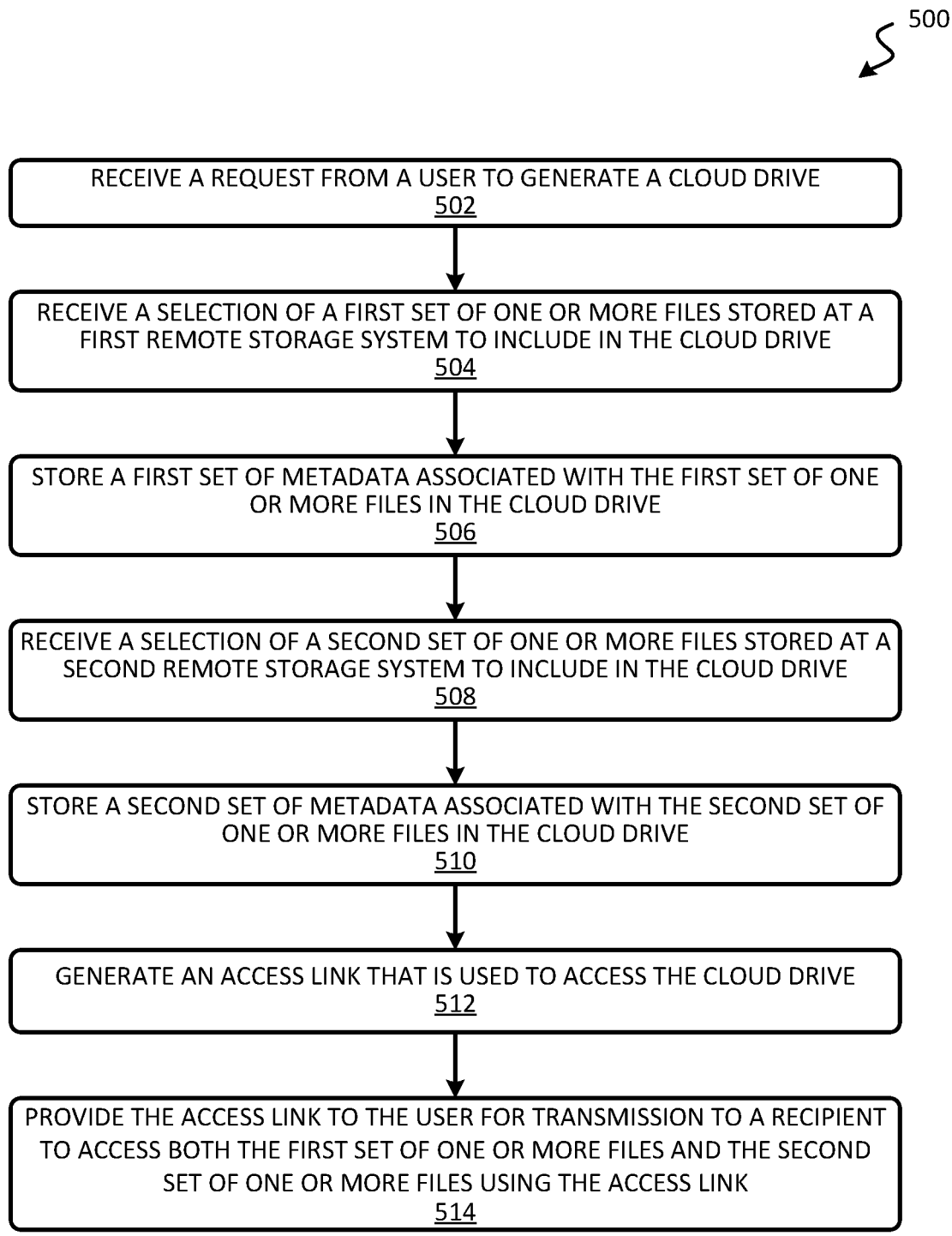
FIG. 5 illustrates a process for management of remotely stored data, according to some embodiments.

FIG. 5 illustrates a process 500 for management of remotely stored data, according to some embodiments. Process 500 can be performed by a remote storage management system to provide a unified file system that interacts with different remote storage services to allow a user to manage, from one interface, the user's data stored in different source systems, and to allow the user to share any combination of files using a single access link. Initially, the user may set up an account with the remote storage management system, and may register the user's access credentials at different remote storage systems with the remote storage management system. For example, the remote storage management system may store the user's access credentials such as usernames and passwords of various accounts with different remote storage systems. In some embodiments, instead of storing usernames and passwords, the remote storage management system may store credentials in the form of access tokens (e.g., string tokens) such that the user's usernames and passwords are not stored at the remote storage management system. The access tokens can be provided to remote storage management system from each remote storage system in response the user authorizing each remote storage system to grant the remote storage management system access to the user's account. Process 500 can be initiated by the user accessing the user's account at the remote storage management system on a user computing device, for example, via a web browser, application, or plug-in installed on the user computing device.

At block 502, the remote storage management system may receive a request from the user to generate a cloud drive. The cloud drive can be given an identifier such as a drive name, and is linked to the user's account at the remote storage management system. In response to the request, the remote storage management system may provide a list of remote storage service providers with which the user has an account. For example, the remote storage management system may render a pop-up window with the various remote storage service providers on the user computing device.

The user may select a first remote storage system from various remote storage service providers that the user has an account with. In response to the selection of the first remote storage system, the remote storage management system may access the first remote storage system using the user's access credentials stored at the remote storage management system, and provide the user computing device with access to the user's data stored at the first remote storage system. The user may navigate the user's file directory stored at the first remote storage system and select individual files, folders/subfolders, or a combination thereof for addition to the cloud drive.

At block 504, the remote storage management system may receive the selection of a first set of one or more files stored at the first remote storage system to include in the cloud drive. The remote storage management system may obtain metadata associated with the first set of one or more files from the first remote storage system. The metadata may include information necessary to identify each selected file at the first remote storage system such as filename, file path, and/or file owner, etc., as well as other information pertaining to the characteristics and/or properties of the selected file. At block 506, the remote storage management system may store the first set of metadata associated with the first set of one or more files in the cloud drive, and create a directory structure in the cloud drive corresponding to the selected first set of one or more files stored at the first remote storage system.

After adding the first set of one or more files stored at the first remote storage system to the cloud drive, the user may select a second remote storage system from various remote storage service providers that the user has an account with. In some embodiments, the first and second remote storage systems can be associated with different service providers, and hence may require different access credentials. In response to the selection of the second remote storage system, the remote storage management system may access the second remote storage system using the user's access credentials associated with the second remote storage system stored at the remote storage management system, and provide the user computing device with access to the user's data stored at the second remote storage system. The user may navigate the user's file directory stored at the second remote storage system and select individual files, folders/subfolders, or a combination thereof for addition to the cloud drive.

At block 508, the remote storage management system may receive the selection of a second set of one or more files stored at the second remote storage system to include in the cloud drive. The remote storage management system may obtain metadata associated with the second set of one or more files from the second remote storage system. At block 510, the remote storage management system may store the second set of metadata associated with the second set of one or more files in the cloud drive, and update the directory structure in the cloud drive corresponding to include the second set of one or more files stored at the second remote storage system. This process can be repeated for multiple remote storage systems to allow the user to add files from any number of disparate remote storage systems that the user may have an account with. It should be noted that in some embodiments, the remote storage management device does not need to store the first and second set of one or more files in the cloud drive, and only the metadata associated with the files are stored in the cloud drive. This eliminates the need to copy the files over to the cloud drive and makes it unnecessary to impose any size limitation to the cloud drive, because the files are maintained at the respective remote storage systems instead of the cloud drive.

In some embodiments, the user may create multiple cloud drives with the remote storage management system and different combinations of files resident at different remote storage systems can be added to each cloud drive. A particular file can also be included in multiple cloud drives. In this manner, each cloud drive can be customized according to the user's needs. New cloud drives can also be created from existing cloud drives, and files from an existing cloud drive can be combined with files from remote storage systems to form a new cloud drive. For example, the cloud drive created in the blocks 502-510 discussed above can be a first cloud drive, and the remote storage management system may receive a request from the user to generate a second cloud drive to include one or more files from the first cloud drive. The metadata associated with the files from the first cloud drive can be stored at the second cloud drive. The remote storage management system may also receive a selection of a file stored at a third remote storage system to include in the second cloud drive, and the remote storage management system may store metadata associated with that file in the second cloud drive using technique similar to those discussed above. To enable the user to select files from an existing cloud drive, in addition to providing a list of remote storage service providers for the user to select files to add to a cloud drive, the remote storage management system may also additionally provide a list of the user's existing cloud drives from which the user can select files to add to the cloud drive. In some embodiments, the remote storage management system may itself act as a remote storage system that hosts and stores some of the user's files, and the user may be allowed to select files stored locally at the remote storage management system to add to a cloud drive.

In some embodiments, each of the generated cloud drive can be represented as a computer drive on the user computing device. For example, an application or plug-in associated with the remote storage management system installed on the user computing device may create a networked drive on the user computing device and map the networked drive to the cloud drive. This may allow the user to access the cloud drive using the user computing device's native file system. From the user's perspective, the cloud drive would appear as a networked computer drive, and the user may access the files in the cloud drive by selecting the cloud drive from the user computing device's file system.

Once a cloud drive has been created, the user may be allowed to perform synchronization operations to view or modify the files in the cloud drive. For example, the user may select one or more files and/or folders/subfolders in the cloud drive from the user computing device, and invoke a synchronization command to download the selected files onto the user computing device. The user can view the local copy of a file and/or modify the contents of the local copy of the file. Any modifications made to the local copy can be reflected at the source of the file. In other words, changes made to the local copy of the file at the user computing device can be reflected at the file stored at the corresponding remote storage system. When the file is not in use or is no longer needed, the user may unsynchronize the file and free up the local storage memory taken up by the local file at the user computing device. The metadata associated with the file can be retained at the user computing device, and the user can select the file from the cloud drive to synchronize the file to the user computing device again at a later time when the file is needed.

According to some embodiments, each of the cloud drive can also be shared with one or more recipients. The user may select a cloud drive at the remote storage management system, and request the remote storage management system to generate an access link (e.g., a URL) to the selected cloud drive. Referring back to FIG. 5, at block 512, the remote storage management system may generate an access link that is used to access the first cloud drive described above. In some embodiments, the access link may include information pertaining to an access token that a recipient of the access link can use to access the remote storage management system. This may allow a recipient that may not have an account with remote storage management system to nevertheless access the shared cloud drive. At block 514, the generated access link is provided to the user for transmission to a recipient to share the cloud drive with the recipient, and to allow the recipient to use the access link to access both the first set of one or more files stored at the first remote storages system and the second set of one or more files stored at the second remote storage system. The user may also share the second cloud drive described above, and a second access link that is used to access the second cloud drive can be generated for a recipient. In some embodiments, the user may also select multiple cloud drives to share with a recipient, and a single access link to the multiple cloud drives can be generated.

The user may also set the read/write permissions of the recipient for the cloud drive to indicate whether the recipient can only view the files in the cloud drive or can modify the files in the cloud drive. The access link can be configured to provide the proper access to the recipient. In some embodiments, the read/write permissions can be set per file, per folder/subfolder, or for the entire cloud drive. If the cloud drive is shared with multiple recipients, the read/write permissions for each recipient can be set independently. In some embodiment, the access link can also be associated with an expiration time after which the access link cannot be used to access the cloud drive, and the expiration time can be set differently for different recipients.

Upon receiving an access link to access a cloud drive hosted by the remote storage management system, the recipient may open the access link on a recipient computing device. The access link may direct a web browser, application, or plug-in of the recipient computing device to the remote storage management system. The remote storage management system may verify the access link and the access permissions for the recipient, and present a directory structure representing the cloud drive on the recipient computing device. In some embodiments, the cloud drive can be represented as a computer drive on the recipient computing device. For example, an application or plug-in associated with the remote storage management system installed on the recipient computing device may create a networked drive on the user computing device and map the networked drive to the cloud drive in response to the recipient opening the access link. This may allow the recipient to access the cloud drive using the recipient computing device's native file system. From the recipient's perspective, the cloud drive would appear as a networked computer drive, and the recipient may access the files in the cloud drive by selecting the cloud drive from the recipient computing device's file system.

To access a file from the shared cloud drive, the recipient may open the access link and navigate the directory structure representing the cloud drive to select a file from the cloud drive to access. For example, the user may request a file in the cloud drive corresponding to a file in the first set of one or more files stored at the first remote storage system described above to be synchronized or downloaded to the recipient computing device. The remote storage management system may receive the request from the recipient computing device associated with the recipient to synchronize the file, and send the access credential associated with the user's account at the first remote storage system to the first remote storage system on behalf of the recipient computing device to access the file. The file can then be synchronized to the recipient computing device from the first remote storage system without requiring the recipient computing device to provide the access credential. In this manner, the remote storage management system can act as a broker for accessing various remote storage systems, and a recipient of an access link need not have an account with any of the remote storage systems or with the remote storage management system to access files shared by a user. In some embodiments, if the recipient has write access to the files, the recipient may perform synchronization and unsynchronization operations on the files similar to those discussed above.

Accordingly, techniques for managing a user's files stored at multiple remote storage systems have been described herein. By utilizing the techniques described herein, remote files stored with multiple service providers can be unified into one or more cloud drives and be accessed from a unified file system. Each cloud drive can contain any combination of files from the different remote storage systems, and each cloud drive can be shared with one or more recipients. A single access link can be used to access files stored at different remote storage systems. The user can also customize each cloud drive with the proper contents for the intended recipient.

Figure 6:
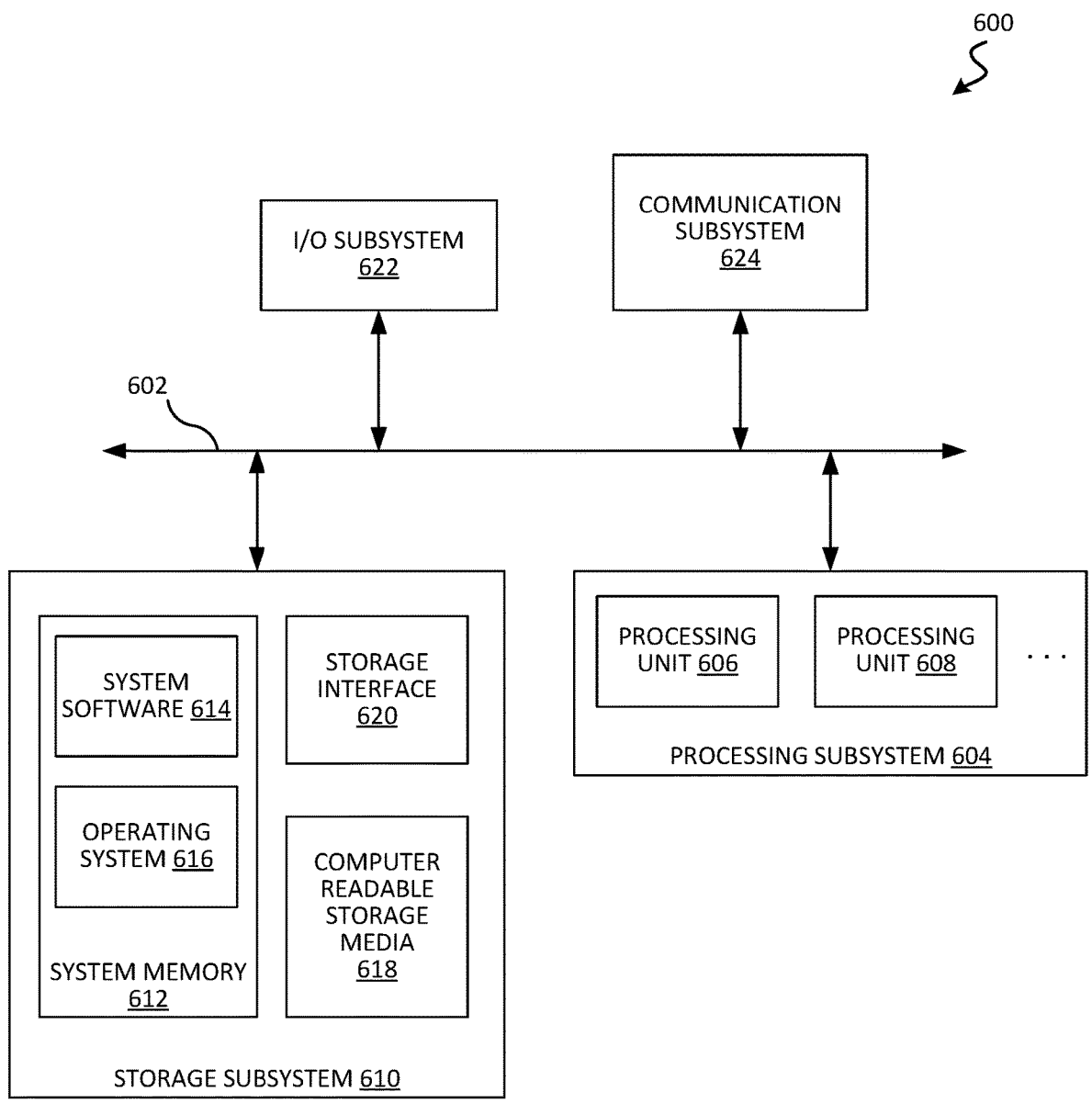
FIG. 6 illustrates a block diagram of a computing system, according to some embodiments

FIG. 6 illustrates a block diagram of a computing system 600, according to some embodiments. Computing system 600 can be used to implement at least some of the computing devices described herein. Computing system 600 can include a communications bus 602 that provides connections to one or more subsystems, including a processing subsystem 604, storage subsystem 610, I/O subsystem 622, and communication subsystem 624. In some embodiments, processing subsystem 608 can include one or more processing units 606, 608, etc. A processing unit can include one or more of a general purpose or specialized microprocessor, FPGA, DSP, or other processor. In some embodiments, a processing unit can be a single core or multicore processor.

In some embodiments, storage subsystem 610 can include system memory 612 which can include various forms of non-transitory computer readable storage media, including volatile (e.g., RAM, DRAM, cache memory, etc.) and non-volatile (flash memory, ROM, EEPROM, etc.) memory. Memory may be physical or virtual. System memory 612 can include system software 614 (e.g., BIOS, firmware, various software applications, etc.) and operating system data 616. In some embodiments, storage subsystem 610 can include non-transitory computer readable storage media 618 (e.g., hard disk drives, floppy disks, optical media, magnetic media, and other media). A storage interface 620 can allow other subsystems within computing system 600 and other computing systems to store and/or access data from storage subsystem 610.

In some embodiments, I/O subsystem 622 can interface with various input/output devices, including displays (such as monitors, televisions, and other devices operable to display data), keyboards, mice, voice recognition devices, biometric devices, printers, plotters, and other input/output devices. I/O subsystem 622 can include a variety of interfaces for communicating with I/O devices, including wireless connections (e.g., Wi-Fi, Bluetooth, Zigbee, and other wireless communication technologies) and physical connections (e.g., USB, SCSI, VGA, SVGA, HDMI, DVI, serial, parallel, and other physical ports).

In some embodiments, communication subsystem 624 can include various communication interfaces including wireless connections (e.g., Wi-Fi, Bluetooth, Zigbee, and other wireless communication technologies) and physical connections (e.g., USB, SCSI, VGA, SVGA, HDMI, DVI, serial, parallel, and other physical ports). The communication interfaces can enable computing system 600 to communicate with other computing systems and devices over local area networks, wide area networks, ad hoc networks, mesh networks, mobile data networks, the internet, and/or other communication networks.

It should be understood that the methods and processes described herein are exemplary in nature, and that the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It should also be understood that the components (e.g., functional blocks, modules, units, or other elements, etc.) of the devices, apparatuses, and systems described herein are exemplary in nature, and that the components in accordance with some embodiments may include one or more additional elements not specially described, omit one or more elements, combine one or more elements into a single element, split up one or more elements into multiple elements, and/or any combination thereof.

Although specific embodiments of the invention have been described, various modifications, alterations, alternative constructions, and equivalents are also encompassed within the scope of the invention. For example, one or more features from any embodiment may be combined with one or more features of any other embodiment. As another example, although some of the operations, configurations, and/or settings have been described as being applied at the file level (e.g., operate independently on individual files), the operations, configurations, and/or settings can also be applied at a folder or directory level (e.g., operate on all files and subfolders within a folder or directory), or vice versa.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Further, while embodiments of the present invention have been described using a particular combination of hardware and software, it should be recognized that other combinations of hardware and software can also be used. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof.

A recitation of "a," "an," or "the" is intended to mean "one or more" unless specifically indicated to the contrary.

What is claimed is:

1. A computer-implemented method comprising:
   receiving, by a remote storage management device, a request from a user to generate a cloud drive;
   receiving, by the remote storage management device, a selection of a first set of one or more files stored at a first remote storage system associated with a first service provider to include in the cloud drive;
   storing, by the remote storage management device, a first set of metadata associated with the first set of one or more files in the cloud drive;
   receiving, by the remote storage management device, a selection of a second set of one or more files stored at a second remote storage system associated with a second service provider that is different from the first service provider to include in the cloud drive;
   storing, by the remote storage management device, a second set of metadata associated with the second set of one or more files in the cloud drive;
   generating, by the remote storage management device, an access link that is used to access the cloud drive; and
   providing, by the remote storage management device, the access link to the user for transmission to a recipient to access both the first set of one or more files and the second set of one or more files using the access link without requiring the recipient to have an account with either the first or second service providers,
   wherein opening the access link on a recipient computing device creates a directory structure mapped to the cloud drive on the recipient computing device, wherein the directory structure allows the recipient to access both the first set of one or more files stored at the first remote storage system and the second set of one or more files stored at the second remote storage system.

2. The computer-implemented method of claim 1, wherein the remote storage management device does not store the first set of one or more files and does not store the second set of one or more files in the cloud drive.

3. The computer-implemented method of claim 1, further comprising storing an access credential at the remote storage management device to access the first set of one or more files from the first remote storage system.

4. The computer-implemented method of claim 3, wherein the access credential is an access token.

5. The computer-implemented method of claim 1, further comprising:
   receiving a request from a recipient computing device associated with the recipient to synchronize a file in the first set of one or more files to the recipient computing device in response to the recipient opening the access link; and
   sending an access credential to the first remote storage system on behalf of the recipient computing device to access the file and to synchronize the file to the recipient computing device without requiring the recipient computing device to provide the access credential.

6. The computer-implemented method of claim 1, further comprising:
   representing the cloud drive as a computer drive on a user computing device associated with the user.

7. The computer-implemented method of claim 1, wherein the cloud drive is a first cloud drive, the access link is a first access link, and the method further comprises:
   receiving a request to generate a second cloud drive that includes one or more files from the first cloud drive; and
   generating a second access link that is used to access the second cloud drive.

8. The computer-implemented method of claim 7, further comprising:
   receiving a selection of a file stored at a third remote storage system to include in the second cloud drive; and
   storing metadata associated with the file in the second cloud drive.

9. The computer-implemented method of claim 1, wherein the access link is associated with an expiration time after which the access link cannot be used to access the cloud drive.

10. A computing device comprising:
a processor; and
a memory storing executable code, which when executed by the processor, implements operations including:
receiving a request from a user to generate a cloud drive;
receiving a selection of a first set of one or more files stored at a first remote storage system associated with a first service provider to include in the cloud drive;
storing a first set of metadata associated with the first set of one or more files in the cloud drive;
receiving a selection of a second set of one or more files stored at a second remote storage system associated with a second service provider that is different from the first service provider to include in the cloud drive;
storing a second set of metadata associated with the second set of one or more files in the cloud drive;
generating an access link that is used to access the cloud drive; and
providing the access link to the user for transmission to a recipient to access both the first set of one or more files and the second set of one or more files using the access link without requiring the recipient to have an account with either the first or second service providers,
wherein opening the access link on a recipient computing device creates a directory structure mapped to the cloud drive on the recipient computing device, wherein the directory structure allows the recipient to access both the first set of one or more files stored at the first remote storage system and the second set of one or more files stored at the second remote storage system.

11. The computing device of claim 10, wherein the computing device does not store the first set of one or more files and does not store the second set of one or more files in the cloud drive.

12. The computing device of claim 10, wherein the operations further includes storing an access credential at the computing device to access the first set of one or more files from the first remote storage system.

13. The computing device of claim 12, wherein the access credential is a string token.

14. The computing device of claim 10, wherein the operations further include:
receiving a request from a recipient computing device associated with the recipient to synchronize a file in the first set of one or more files to the recipient computing device in response to the recipient opening the access link on the recipient computing device; and
sending an access credential to the first remote storage system on behalf of the recipient computing device to access the file and to synchronize the file to the recipient computing device without requiring the recipient computing device to provide the access credential.

15. The computing device of claim 14, wherein the operations further include:
representing the cloud drive as a computer drive on a user computing device associated with the user.

16. The computing device of claim 10, wherein the cloud drive is a first cloud drive, the access link is a first access link, and the operations further include:
receiving a request to generate a second cloud drive that includes one or more files from the first cloud drive; and
generating a second access link that is used to access the second cloud drive.

17. The computing device of claim 16, wherein the operations further include:
receiving a selection of a file stored at a third remote storage system to include in the second cloud drive; and
storing metadata associated with the file in the second cloud drive.

18. The computing device of claim 10, wherein the access link is associated with an expiration time after which the access link cannot be used to access the cloud drive.

\* \* \* \* \*